Feb. 10, 1953  H. C. NORTHEIM  2,627,987
POWER WINCH UNLOADER
Filed Jan. 9, 1948  4 Sheets-Sheet 1

Inventor
Harry C. Northeim

By *Clarence A. O'Brien
and Harvey B. Jacobson*
Attorneys

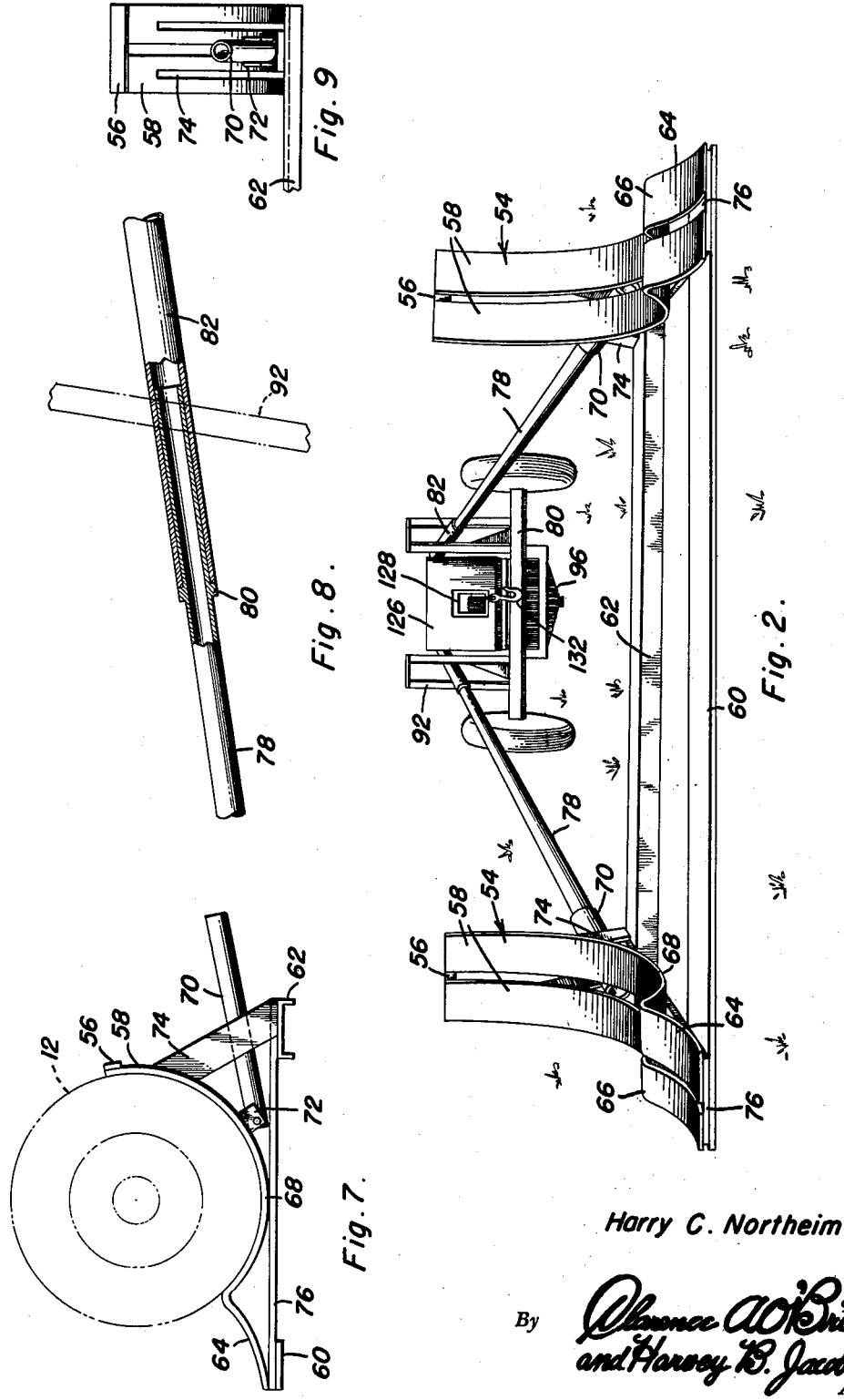

Feb. 10, 1953

H. C. NORTHEIM 2,627,987

POWER WINCH UNLOADER

Filed Jan. 9, 1948

Inventor

Harry C. Northeim

By *Clarence A. O'Brien and Harvey B. Jacobson*

Attorneys

Feb. 10, 1953 H. C. NORTHEIM 2,627,987
POWER WINCH UNLOADER
Filed Jan. 9, 1948 4 Sheets-Sheet 4

Harry C. Northeim
INVENTOR.

Patented Feb. 10, 1953

2,627,987

UNITED STATES PATENT OFFICE 2,627,987

POWER WINCH UNLOADER

Harry C. Northeim, Amherst, Ohio

Application January 9, 1948, Serial No. 1,328

2 Claims. (Cl. 214—44)

This invention relates generally to unloading devices, and more particularly to means for unloading material from a wheeled vehicle having a loading platform which may or may not have lateral walls, the device comprising chocks to retain the wheels of the vehicle and a powered winch, with novel means for spacing the winch from the chocks.

A primary object of this invention is to provide means whereby material can be expeditiously unloaded from one end of a loading platform, the whole load of material being gradually moved relative to the box container or loading platform of the vehicle, which vehicle will be thought of as ordinarily comprising a motor truck or a wagon, the load containing portion of which is either an open ended box, a box in which one end may be removed, or a flat platform with only small lateral walls or no walls at all, the utility of the device as used in the last mentioned instance resulting from the fact that the material pusher may be propelled along a flat platform without deviating from proper transverse disposition to this platform, by reason of the securement of cables to both ends of the said material pusher.

Another object of this invention is to provide convenient means for chocking the vehicle in place, the chocks used being combined in function with the winch by means of spacer members.

Still another object of this invention is to provide means of this character in which no one part thereof is unduly bulky or heavy, the winch being provided on a wheeled frame and the spacer means comprising a pair of inflexible bars which are removably secured to the chocks and winch frame, to facilitate storage and transportation.

This invention comprehends provision of novel means for securing the said inflexible bars to the chocks and winch frame, whereby the device is made more versatile by allowing the chocks and winch to be at slightly different levels, while other elements of this invention such as the inclined front panel of the material pusher constitute highly utilitarian and novel improvements.

And a last object to be mentioned specifically is to provide an unloading means for vehicles which is relatively inexpensive and practicable to manufacture, which is safe, convenient and expeditious in use, and which will give generally efficient and durable service.

With these objects definitely in view, this invention resides in certain novel features of construction, combination and arrangement of elements and portions which will hereinafter be described in the specification, particularly pointed out in the appended claims, and illustrated in the accompanying drawings which form a material part of this application, and in which:

Figure 2 is a rear view of this invention, without the material pusher;

Figure 1:
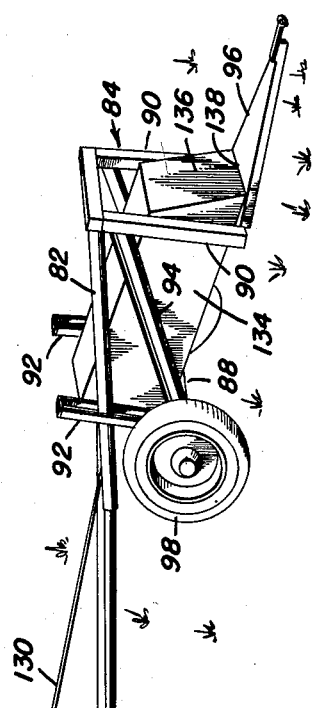
Figure 1 is a three dimensional view of a wagon with this invention operatively applied thereto, the box of the wagon being shown in dotted lines, and the material pusher being positioned as at the start of its travel along the loading platform of the wagon.
Figure 3:
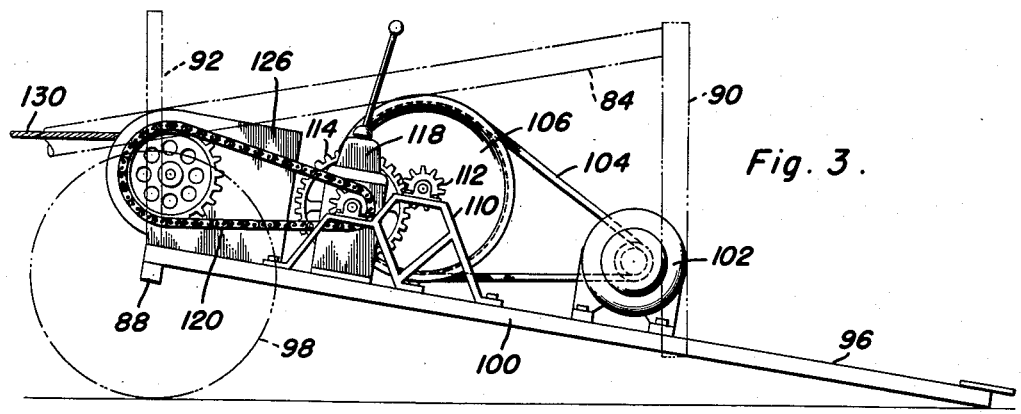
Figure 4:
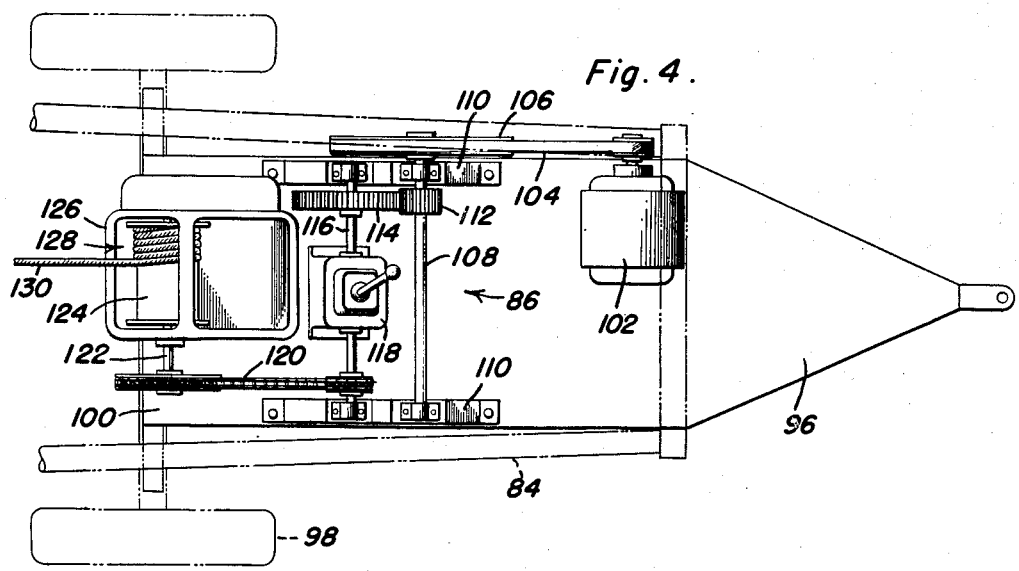
Figure 5:
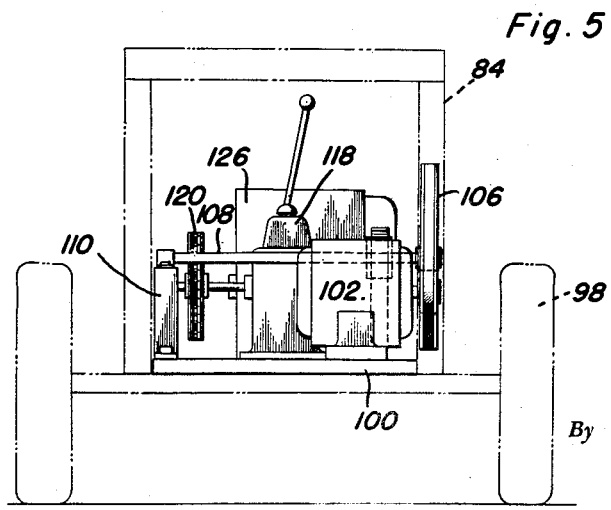

Figure 3 is a right hand side elevational view of the frame of the winch with the power means and power transmission means mounted thereon, the figure including a fragmentary portion of a cable which is wound on the drum of the winch, and certain portions of the frame and ground-contacting wheels being shown in phantom lines, to facilitate the illustration, it being understood that the sheet metal hood or casing for the winch mechanism illustrated in Figure 1 is removed in the representation of this portion of the invention in the other figures;

Figure 4 is a top plan view of the structure illustrated in Figure 3;

Figure 5 is a view representing a front end elevation of the structure shown in Figures 3 and 4, the frame being tilted upwardly so that the longitudinal frame members are substantially horizontal and the tongue portion of the frame being deleted from the figure.

Figure 6:
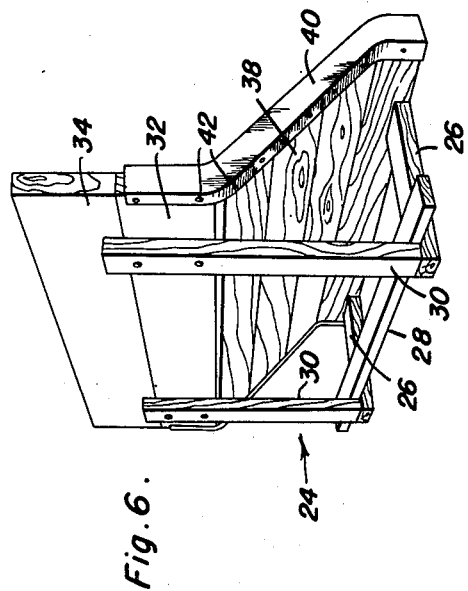
Figure 10:
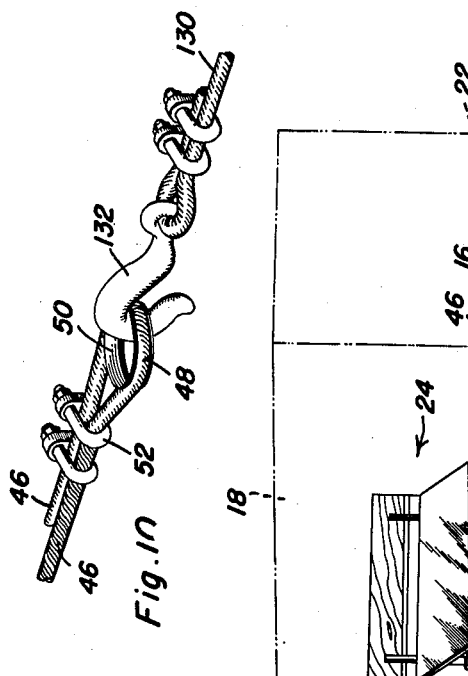
Figure 11:
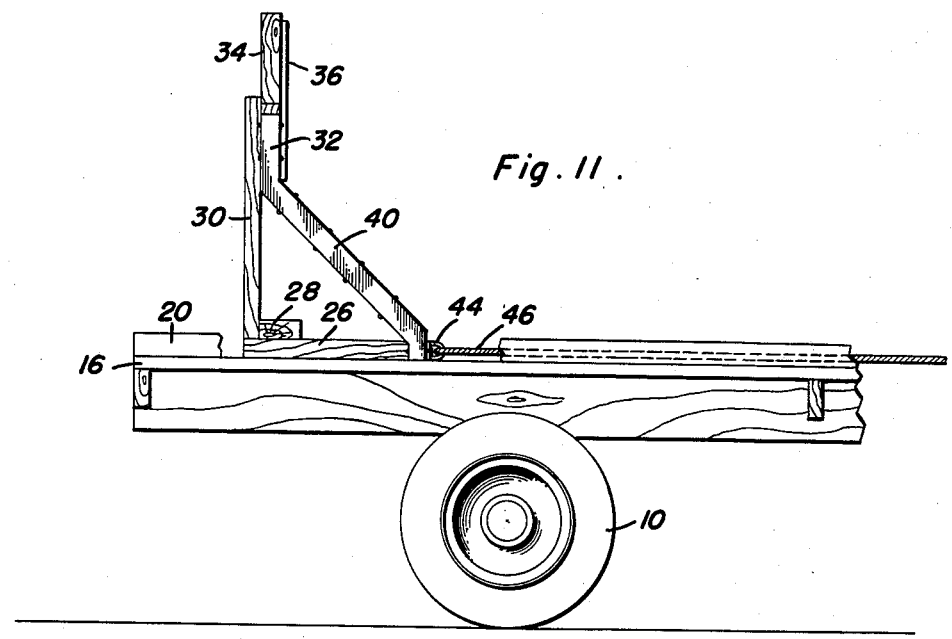
Figure 12:
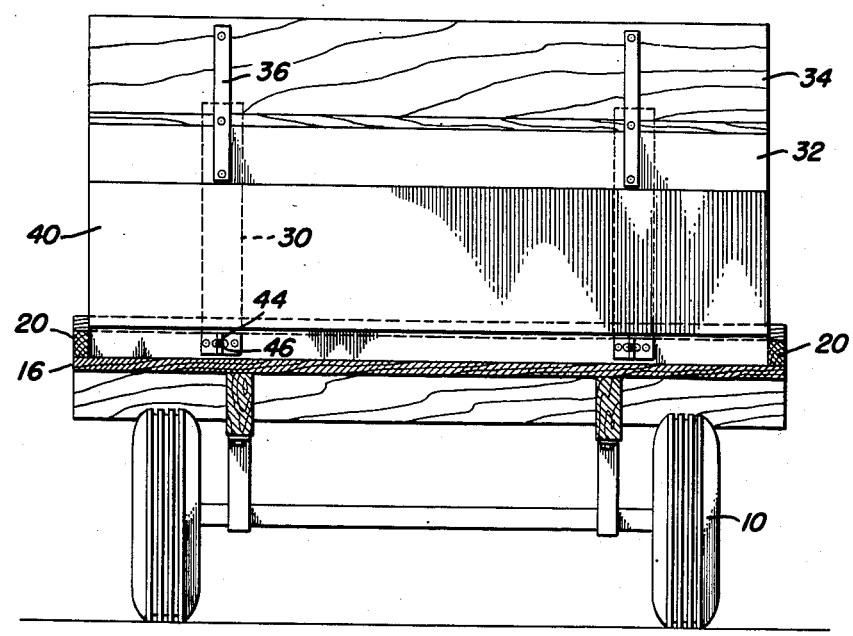

Figure 6 is a three dimensional view of the material pusher;

Figure 7 is an end elevational view of the chock assembly, a wheel of a vehicle being shown in phantom lines as supported in the chock assembly;

Figure 8 is an enlarged fragmentary detail view of a portion of one of the inflexible bars, a portion of one of the lateral guides being illustrated in phantom lines, and portions of the inflexible rod and what is hereinafter referred to as the socket member associated therewith, being broken away and the underlying portions shown in vertical longitudinal section;

Figure 9 is an enlarged fragmentary detail view of one of the chock members and the socket member and lateral guides for this socket member, the view being a front elevational view of the right hand end of the chock assembly, viewed as from the right hand side of Figure 1;

Figure 10 is a three dimensional view of a portion of the cable assembly;

Figure 11 is a side elevational view of the rear portion of a wagon with the material pusher mounted thereon, it being noted that in this figure the loading platform of the wagon is represented as having relatively low side wall members, the adjacent side wall member being broken away to disclose the structure of the lower portion of the material pusher; and Figure 12 is a vertical transverse sectional view of the structure illustrated in Figure 11, the view being taken on a vertical plane near the right hand end of the figure.

Similar characters of reference designate similar or identical elements and portions throughout the specification and throughout the several views of the drawing.

Referring now to the drawings in detail, the environment wherewith this invention is adapted to be used includes a wagon having ground contacting rear wheels 10 and front wheels 12, chassis 14 and a loading platform 16. It should be noted that this platform will ordinarily have vertical walls indicated in dash lines in Figure 1 at 18, these walls being not necessarily of any great height, as indicated by the representation of similar wall structure 20 in Figures 11 and 12. But one end as at 22, of any box-like structure on the vehicle must either be open or have a removable door or panel.

This invention proposes the provision of a material pusher 24 which may be constructed in various forms, one embodiment thereof being illustrated in the drawing as comprised of a pair of horizontal base members 26 spaced apart and parallel to each other, braced by a transverse member 28 and carrying a pair of rigid uprights 30 which are bolted to a transverse member 32 at their upper ends, together with another similar transverse member 34 supported in part by the uprights 30 and in part by vertical braces 36 on the front sides of the transverse members 32 and 34, and an inclined front panel which may be comprised of wooden transverse supporting members 38 and a metal facing 40 which is bent around the ends of the members 32 and 38 and marginally secured by means of screws or the like 42. The lowermost of the members 38 will be rigidly secured to the base members 26 and eye members 44 will be secured adjacent each end and on the front sides of the base portions of this material pusher for connection to the rear terminals of cables 46. If preferred these cables 46 may be unitary and simply looped as at 48 in Figure 10 with a grommet 50 and suitable clamps 52 completing this structure. It is preferred that the cables 46 be of a length substantially equal to the length of the loading platform 16.

The chock assembly comprises two wheel chocks 54 each comprised of a pair of similarly configurated inflexible straps spaced apart slightly and connected at the top by cross braces 56, these straps being indicated by the numeral 58, in Figure 2. The lower ends of the strap members 58 are rigidly secured to a transverse spacer member 60 of rectangular cross section, while intermediate portions of the said straps are rigidly secured, as by welding, to the end portions of a second spacer member 62, preferably of channel cross section. The chocks 54 are each arcuate and a ramp portion 64 of each strap member extends upwardly as at 66 above the level of the wheel wells 68 at their lowest points, this construction facilitating the rolling of the wheels of the vehicle onto the chock assembly, while satisfactorily retaining these same wheels therein during the operation of the device.

A pair of socket members 70 are pivotally secured to lugs 72 carried by lower intermediate portions of the strap members 58, and a pair of lateral guide members 74 are disposed on the sides of the socket members 70, the lateral guide members being terminally secured as by welding to the front major member 62 and to forward upper portions of the strap members 58. To add strength to the chock assembly, a pair of base plates 76 are secured to and between the rear end portions of the ramp portions 64 and the channel member 62, these members 76 being preferably disposed near the ends of the chock assembly.

The socket members 70 are adapted to receive one end of each of a pair of inflexible bars 78, and the forward end portions of these bars are provided with annular stop collars 80 adapted to abut the rear end of somewhat similar socket members 82 which are rigidly secured to the front portions of the frame 84 carrying the winch assembly.

The frame 84 is best illustrated in Figure 1 and includes an axle member 88, front and rear vertical members 90 and 92, the latter being of inverted U-shape to comprise lateral guides for the socket members 82, together with inclined lateral brace members 94 and a tongue 96. A pair of wheels 98 are secured to the end of the axle member 88 and the frame includes a bed plate 100 which may be integrated with the rear portion of the tongue 96, and with the lower end portions of the members 90 and 92, so as to give rigidity to the frame. Any suitable power means may be used in this invention but it is preferred to use an electric motor 102, coupled by a belt 104 with a pulley 106 carried on a shaft 108 which is supported on terminal bearings 110 secured to the bed plate 100. It is preferred that reduction gearing be included, represented by the gear 112 on the shaft 108 and a larger gear 114 on a rotatably mounted shaft 116, together with a gear shift mechanism 118, preferably having three forward speeds and a reverse, and finally a chain drive 120 between the gear shift 118 and the drive shaft 122 for the winch drum 124. The electric motor 102 and the gear shift assembly 118 will also be supported on the bed plate 100, but the winch drum 124 will be housed within a casing 126. The housing 126 is apertured at 128 to accommodate the winding cable 130 which is terminally secured to the drum 124 and carries a hook 132 on the outer end. This hook is adapted to be engaged in the looped portion 48 of the cables 46.

It may be here noted that a hood 134 will be provided to cover the winch mechanism 86, and the portion 136 at the front end of the hood 134 may be hinged at its lower edge 138 to facilitate maintenance and repair of the winch mechanism by giving access thereto.

The operation of this invention will be clearly understood from the foregoing description of the mechanical details thereof, taken in connection with the above recitation of the objects thought to be achieved by this invention. In recapitulation it may be added that the wagon may be either backed rearwardly upon the chock assembly, or run forwardly thereupon, depending upon which end of the box or material container of the wagon or other vehicle is open or openable, since the material pusher 24 will always necessarily be pulled toward the open end, when only one end is opened. It will be clear that the weight of the winch mechanism and frame will ordinarily be sufficient to prevent the raising of this portion of the device in the event that the material pusher 24 should become lodged, and it will be understood that conveniently positioned control members, such as the gear shift lever on the gear shift mechanism 118 and a switch controlling the current to the electric motor 102, not shown, will be provided to make this unloading very easily operated, and in this connection it should be noted that the several speeds of winding achieved by the provision of the gear shift mechanism 118 will enable the operator of this invention to unload material from the vehicle at the desired rate, that is, to propel the material pusher 24 along the platform so that material is delivered at the open end of the vehicle at the desired rate.

Many minor variations may be made in the exact detail of construction and proportionment of the various elements in this invention, all without departure from the spirit and scope thereof and the drawings particularly should be conceived as illustrative rather than limiting.

Accordingly, the scope of this invention should be determined by a proper interpretation of the terms used in the subjoined claims.

Having described the invention, what is claimed as new is:

1. Means for unloading material from a wheeled vehicle having a loading platform which may have lateral walls, comprising chocks to retain wheels of a vehicle against turning, a winch having a frame, inflexible elongated bars terminally secured to and between said chocks and said frame to preserve a predetermined spacing of the winch from the chocks and to stabilize the frame against rotation with said winch, a material pusher slidably mounted on said platform, and cable means operatively connecting said pusher and said frame, said winch being mounted on ground contacting wheels, said chocks and frame having socket members, and said bars being removably and terminally insertable in said socket members, said winch being power driven, a motor with a reduction gear assembly and a gear shift mounted on said frame and operatively connected with said winch, said socket members being pivotally mounted on said chocks and frame, and lateral guides on said chocks and frame for said socket members to assure equalization of strains on the chocks and bars.

2. Means for unloading material from a platform of a wheeled vehicle comprising a pusher adapted to be propelled along said platform, a wheel supported frame adapted to be arranged at one end of the vehicle in spaced relation thereto, a power winch on said frame, a pull cable extending from said winch and connected to said pusher to propel the same, a pair of chocks for a pair of wheels of the vehicle, and means rigidly connecting said chocks to said frame in spaced relation thereto to maintain said frame and vehicle spaced apart during pull on the pusher by said cable.

HARRY C. NORTHEIM.

REFERENCES CITED

The following references are of record in the file of this patent:

UNITED STATES PATENTS

| Number | Name | Date |
|---|---|---|
| 507,122 | Harrington | Oct. 24, 1893 |
| 1,614,797 | Marsh et al. | Jan. 18, 1927 |
| 1,769,939 | Berasi | July 8, 1930 |

FOREIGN PATENTS

| Number | Country | Date |
|---|---|---|
| 565,658 | Germany | Dec. 3, 1932 |
| 51,326 | Denmark | Mar. 2, 1936 |